US008833235B2

(12) United States Patent
Fabozzi et al.

(10) Patent No.: US 8,833,235 B2
(45) Date of Patent: Sep. 16, 2014

(54) IN-MOULD LABELLED CONTAINER

(75) Inventors: Thierry Jean Robert Fabozzi, Geneva (CH); Stephane Hentzel, Yvonand (CH)

(73) Assignee: Nestec S.A., Vevey (CH)

( * ) Notice: Subject to any disclaimer, the term of this patent is extended or adjusted under 35 U.S.C. 154(b) by 38 days.

(21) Appl. No.: 13/817,515

(22) PCT Filed: Aug. 11, 2011

(86) PCT No.: PCT/EP2011/063859
§ 371 (c)(1),
(2), (4) Date: Feb. 18, 2013

(87) PCT Pub. No.: WO2012/022672
PCT Pub. Date: Feb. 23, 2012

(65) Prior Publication Data
US 2013/0146495 A1  Jun. 13, 2013

(30) Foreign Application Priority Data
Aug. 20, 2010  (EP) ................................. 10173498

(51) Int. Cl.
| B65D 85/812 | (2006.01) |
| B29C 45/00 | (2006.01) |
| B29D 25/00 | (2006.01) |
| B65D 85/804 | (2006.01) |
| B65D 85/816 | (2006.01) |
| B29C 45/14 | (2006.01) |
| B29L 31/00 | (2006.01) |

(52) U.S. Cl.
CPC ............ B29D 25/00 (2013.01); B29C 45/0046 (2013.01); *B65D 85/804* (2013.01); *B65D 85/816* (2013.01); *B29C 2045/14918* (2013.01); *B29C 45/14836* (2013.01); *B29C 45/14475* (2013.01); B65D 85/8043 (2013.01); *B65D 2565/385* (2013.01); *B29L 2031/712* (2013.01)
USPC ............. 99/275; 220/645; 220/644; 220/646; 220/639; 206/5; 206/459.5; 99/295; 99/300; 99/289 R; 99/323; 426/112; 426/115; 426/86; 426/432; 426/425

(58) Field of Classification Search
USPC .............. 206/0.5, 459.5; 99/295, 300, 289 R, 99/323; 426/12, 82, 86, 115, 422, 423; 220/646, 651, 645
See application file for complete search history.

(56) References Cited

U.S. PATENT DOCUMENTS

| 2,885,290 A | * | 5/1959 | Krasker | .......................... | 99/306 |
| 4,136,202 A | * | 1/1979 | Favre | .............................. | 426/77 |

(Continued)

FOREIGN PATENT DOCUMENTS

| EP | 1440903 | 7/2004 |
| EP | 1650134 | 4/2006 |

(Continued)

OTHER PUBLICATIONS

International Search Report and Written Opinion dated Nov. 14, 2011 in corresponding PCT Application No. PCT/EP2011/063859.

*Primary Examiner* — Mickey Yu
*Assistant Examiner* — Gideon Weinerth
(74) *Attorney, Agent, or Firm* — K&L Gates LLP

(57) ABSTRACT

The present invention concerns an injection-molded capsule for use in a food preparation machine, said capsule for use in a food preparation machine comprising: (i) a structure (1) with a lower side (2), at least three pillars (3) extending from the lower side and linked to a circular upper frame (4) which defines the surroundings of the capsule top side, the pillars (3) having cross-sections S1, S2 and S3, the lower side (2) being a solid wall that comprises a dispensing opening (5) and is centered across the vertical symmetry axis VSA of said capsule, and (ii) a label (6) attached to the outer surface of the lower side (2), pillars (3) and upper circular frame (4), thus forming an envelope that defines capsule side walls, characterized in that the injection point IP of the capsule is off-centered in the vicinity of said dispensing opening (5), opposed the pillar (3) having a cross-section S3 relatively to the axis VSA, and in that S1=S2 and S3>S1.

14 Claims, 1 Drawing Sheet

(56) References Cited

U.S. PATENT DOCUMENTS

| | | | |
|---|---|---|---|
| 4,139,115 A * | 2/1979 | Robinson | 220/645 |
| 4,775,048 A * | 10/1988 | Baecchi et al. | 206/0.5 |
| 4,882,055 A * | 11/1989 | Stamstad | 210/483 |
| 5,012,629 A * | 5/1991 | Rehman et al. | 53/453 |
| 6,682,675 B1 * | 1/2004 | Vandangeot et al. | 264/161 |
| 6,823,624 B2 * | 11/2004 | Proserpio | 47/65.5 |
| 8,161,868 B2 * | 4/2012 | Bolzicco et al. | 99/295 |
| 8,464,894 B2 * | 6/2013 | O'Hagan et al. | 220/644 |
| 8,540,111 B2 * | 9/2013 | Middleton et al. | 220/649 |
| 8,561,524 B2 * | 10/2013 | Demiglio et al. | 99/300 |
| 8,613,612 B2 * | 12/2013 | Middleton et al. | 425/112 |
| 8,651,012 B2 * | 2/2014 | Yoakim et al. | 99/295 |
| 8,721,321 B2 * | 5/2014 | Middleton et al. | 425/400 |
| 8,734,881 B2 * | 5/2014 | Yoakim et al. | 426/431 |
| 2001/0004003 A1 * | 6/2001 | Watanabe et al. | 156/251 |
| 2003/0014912 A1 * | 1/2003 | Proserpio | 47/65.5 |
| 2004/0175455 A1 * | 9/2004 | Fabozzi et al. | 425/595 |
| 2004/0262322 A1 * | 12/2004 | Middleton et al. | 220/675 |
| 2005/0051478 A1 * | 3/2005 | Karanikos et al. | 210/469 |
| 2005/0074514 A1 * | 4/2005 | Anderson et al. | 425/461 |
| 2007/0125238 A1 * | 6/2007 | Urquhart et al. | 99/275 |
| 2007/0163447 A1 * | 7/2007 | Tremblay | 99/295 |
| 2007/0194029 A1 * | 8/2007 | Middleton et al. | 220/659 |
| 2009/0250372 A1 * | 10/2009 | Wnek et al. | 206/557 |
| 2010/0239717 A1 * | 9/2010 | Yoakim et al. | 426/84 |
| 2011/0041702 A1 * | 2/2011 | Yoakim et al. | 99/302 R |
| 2011/0185911 A1 * | 8/2011 | Rapparini | 99/295 |
| 2011/0278762 A1 * | 11/2011 | Middleton et al. | 264/279 |
| 2011/0287197 A1 * | 11/2011 | Britton | 428/34.1 |
| 2012/0118166 A1 * | 5/2012 | Macchi | 99/295 |
| 2012/0207874 A1 * | 8/2012 | Middleton et al. | 425/577 |
| 2012/0225168 A1 * | 9/2012 | Kamerbeek et al. | 426/112 |
| 2012/0231124 A1 * | 9/2012 | Kamerbeek et al. | 426/112 |
| 2012/0242012 A1 * | 9/2012 | Temple, Jr. | 264/511 |
| 2012/0251668 A1 * | 10/2012 | Wong et al. | 426/77 |
| 2013/0025466 A1 * | 1/2013 | Fu et al. | 99/295 |
| 2013/0059039 A1 * | 3/2013 | Trombetta et al. | 426/82 |
| 2013/0087051 A1 * | 4/2013 | Frydman | 99/295 |
| 2013/0133522 A1 * | 5/2013 | Denisart et al. | 99/295 |
| 2013/0139700 A1 * | 6/2013 | Fabozzi et al. | 99/295 |
| 2013/0291739 A1 * | 11/2013 | Mariller | 99/295 |
| 2013/0302467 A1 * | 11/2013 | Kim | 425/564 |
| 2013/0309371 A1 * | 11/2013 | Abegglen et al. | 426/112 |
| 2013/0327223 A1 * | 12/2013 | Bartoli et al. | 99/295 |
| 2013/0333575 A1 * | 12/2013 | Kamerbeek et al. | 99/295 |
| 2014/0053735 A1 * | 2/2014 | Verbeek | 99/295 |
| 2014/0069280 A1 * | 3/2014 | Frydman | 99/295 |

FOREIGN PATENT DOCUMENTS

| | | |
|---|---|---|
| EP | 2236264 A1 * | 10/2010 |
| FR | 2700493 | 7/1994 |
| GB | 1348370 | 3/1974 |
| WO | WO 2013026651 A1 * | 2/2013 |

* cited by examiner

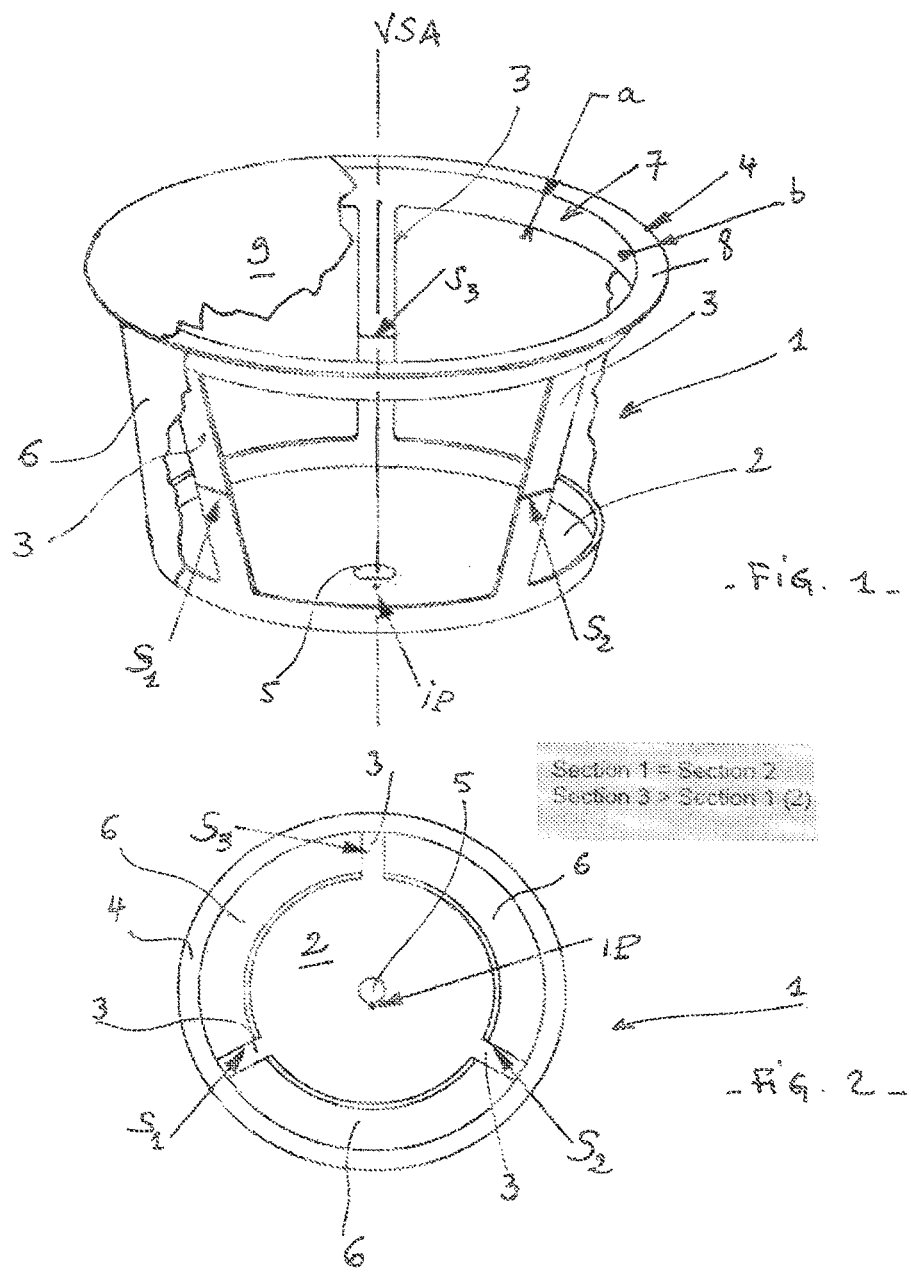

IN-MOULD LABELLED CONTAINER

CROSS REFERENCE TO RELATED APPLICATIONS

The present application is a National Stage of International Application No. PCT/EP2011/063859, filed on Aug. 11, 2011, which claims priority to European Patent Application No. 10173498.6, filed Aug. 20, 2010, the entire contents of which are being incorporated herein by reference.

FIELD OF THE INVENTION

The present invention relates to a packaging for storing food substance. More particularly, the invention relates to a light-weight container and comprising at least two components of different rigidity, and especially a capsule for preparation of a beverage in a food preparation machine.

BACKGROUND OF THE INVENTION

Solid and liquid food substances are usually stored in food-grade liquid-tight containers typically made of plastic materials. The container may be a functional package such as a single-use capsule for preparing a beverage or a cartridge for feeding a beverage production machine with soluble coffee powder or coffee mixes. The package may be a beverage cup for simply holding a beverage or may also be food container for shortenings and the like. All these food and beverage packages are designed to store or simply hold the ingredients or beverage in a liquid-tight environment. Most of the existing packages are over-dimensioned and/or use too much packaging material. In particular, their rigidity-to-weight ratio is not optimized. Therefore, their imprint on environment can be drastically reduced by optimizing this ratio.

Moreover, certain food substances can lose their particular characteristics due to loss of gases or aroma, e.g. carbonated drinks or coffee powder, or need to be kept dry and inaccessible to oxygen and moisture to maintain freshness, e.g. coffee or milk powder. Accordingly, packaging containers with gas barrier properties can be desirable for enabling a long shelf life of the enclosed food substance.

It is known from the prior art to form a mono- or multilayered packaging container for providing a rigid and liquid-tight, eventually gas-tight, container body. Such a container body can then be hermetically sealed for example by means of a dedicated cover member.

It exists also entirely flexible packaging which offer possible alternatives to rigid packaging. One drawback of a flexible container is that it requires an external support for holding liquids in particular hot liquids and/or liquids under pressure. For instance, a flexible beverage capsule requires to be placed in a capsule holder supporting the faces of the capsule in order to avoid the walls to tear apart or burst under the pressure of liquid in the capsule.

In general, these containers are formed by thermoforming, blow moulding or injection moulding of multilayered plastic material. Usually, the plastic material consists of a polypropylene, polyethylene, and/or PET layer for obtaining a rigid container body. For obtaining gas-barrier properties, a secondary layer of plastic material such as of for example ethylene-vinyl-alcohol-copolymer (EVOH), polyamide or metallic material such as aluminium may be present.

However, the above outlined mono- or multilayered design of packaging containers suffers several drawbacks such as its relatively high weight, high manufacturing costs and poor recycling properties.

Moreover, it is known to provide a main body of a packaging container with in-mould labels having oxygen barrier properties.

Thereby, in-mould labelling (IML), which is a label moulding technique used in blow moulded, injection moulded and thermoformed containers, have in general an inner layer compatible with the plastic material which partially melts to bond to the formed plastic structure.

In general, the label is placed in the mould wherein it is held in place by vacuum or other dedicated positioning means. The mould is then closed and molten plastic resin is poured or injected into the mould in order to form the packaging container. Thereby, the adhesive of the label is activated due to the heat resulting from the injection of hot resin and thus, the label is adhered to the container, i.e. the label becomes moulded to the container wall.

EP 1440903 refers to a cartridge for the preparation of a beverage with a barrier coating applied by a number of mechanisms including in-mould labelling.

JP 10129737 A for example relates to a packaging container with an opening having oxygen gas barrier properties. Thereby, an inner wall of a side face of a bottomed container main body and an inner wall of a bottom thereof is provided with in-mould labels for improving the oxygen gas barrier properties of the packaging container.

Furthermore, GB 1348370 discloses a container comprising a structure or frame, made of a rigid or semi rigid material, which is used as a support for applying a softer material, like for instance a film by an in-mould labelling technique so as to obtain a container FR 2700493 A is a French patent application that also discloses a container that is made by injecting a rigid frame onto which a label is attached to complete the container body, for instance by in-mould labelling.

In the field of containers used for food preparation, and in particular in the case of capsules used for the preparation of beverages or the like, in food preparation machines, for instance in coffee machines of the espresso type, capsules are subject to high mechanical forces, due to the temperature of the dissolution or extraction fluid which is injected inside the capsule to extract and/or dissolve the ingredient contained therein and produce a beverage. Another source of mechanical tension exerted onto the capsule is the high pressure of the fluid that is injected into the capsule to realize a proper extraction of the capsule contents. This is particularly true in the case of espresso type beverages, wherein the roast and ground coffee powder that is contained inside the capsule requires a high pressure of injection fluid (e.g. water) to form a quality beverage. Temperatures of the injected fluid can amount up to 70° C., or even about 80° C. to 85° C., and the pressure of the injected fluid inside the capsule can reach 6 to 8 bars, or even 8 to 12 bars. In some particular cases, the pressure inside the capsule during the extraction process can reach pressures higher than 12 bars, for instance comprised between 10 and 20 bars.

It is therefore particularly important that the structure of the capsule be without defect, especially concerning the shape of the capsule, as it must be precisely inserted and positioned inside the extraction chamber of the beverage preparation machine. If the capsule presents structural defects or deformations, there is a risk that the capsule is not properly maintained inside the extraction chamber of the machine, and leakage can appear, or the capsule can even be damaged during the pressure build-up.

Typically, capsule-like containers for use in beverage preparation machines which are known in the art comprise a rigid or semi-rigid structure with a lower side which is preferably disc-shaped, at least one, but preferably at least two and even more preferably at least three substantially vertical pillars extending from the lower side, the said pillars being linked to a top circular frame, which defines the surroundings of the capsule top side. A label is usually attached between the lower side and the upper circular frame, as an envelope, thus defining the capsule side walls. The label is also bound to the pillars, which support it and reinforce the label against laterally directed forces that may apply on the capsule.

Importantly, in order to allow proper closing of the capsule, the circular top frame comprises a L-shaped cross-section, with one circular portion disposed vertically, to which the pillars are linked, the vertical portion being linked at its upper side to a horizontal circular edge of the capsule, onto which a horizontal top wall, for instance a flexible closing film, can be attached (e.g. heat sealed) in order to close the capsule after its filling.

It was found by the applicant that with the in-mould labelled containers and manufacturing methods for making in-mould labelled containers known in the art, the upper portion of the rigid structure can present defects, particularly when the said structure comprises at least three pillars disposed at an equal distance from one another across the periphery of said structure, and when the structure comprises a lower side which is closed except for a central dispensing opening. In this case, the injection point for moulding the structure is off-centred, so that it is not at an equal distance from the pillars.

So far, no appropriate solution was found in such cases, and the known in-mould labelled containers of the art present defects which can be particularly negative and even dangerous when the container is a capsule for use in a beverage preparation machine that injects a fluid under pressure in the said capsule. In such instances, due to the pressure build-up, the zones of the capsule which present defects can be damaged so that leakage will appear in the machine. In some cases, this will lead to poor quality of the final product as a certain quantity of the fluid that is supposed to extract or dissolve the capsule contents, will leak outside. In some more serious cases though, the leakage of fluid under pressure can lead to splashes outside of the beverage preparation machine, onto the consumer, which is of course particularly undesirable, especially when the said fluid is hot.

Such damages to the capsule have been analyzed by the applicant, who found that this is due to delamination of the label in zones of the capsule where the rigid structure does not have sufficient material. This creates grooves or creases in the surface of the structure, or wrinkles in the surface of the label. Such imperfections in the structure and/or surface of the label lead to leakage when pressure inside the capsule builds up.

It is an objective of the present invention to overcome the above imperfections to known in-mould labelled containers.

SUMMARY OF THE INVENTION

The objective set out above is met with an injection-moulded container, preferably a capsule for use in a food preparation machine, said container for use in a food preparation machine comprising:

(i) a rigid or semi-rigid structure with a lower side, at least three pillars, preferably substantially vertical, extending from the lower side and linked to a circular upper frame which defines the surroundings of the container top side, the pillars having cross-sections $S_1$, $S_2$ and $S_3$, the lower side being a solid wall that comprises a through hole as a dispensing opening for the container, that is centred across the vertical symmetry axis of said container, and (ii) a label attached to the lower side, to the pillars and to the outer surface of the upper circular frame, thus forming an envelope that defines container side walls.

According to an essential characteristic of the invention, the injection point of the container is off-centred in the vicinity of said dispensing opening, opposed the pillar having a cross-section $S_3$ relatively to the vertical symmetry axis of the container, and in that $S_1=S_2$ and $S_3>S_1$.

It was found that due to a higher cross section in the pillar that is opposite the injection point, relatively to vertical symmetry axis of the container, the molten material filling the mould at the time the injection process is on-going will flow preferentially through the mould channel corresponding to the pillar having the widest cross section, such that it compensates the fact that the injection point is farther away from this particular pillar mould channel and therefore the molten material has a longer way to go from the said injection point to the said pillar mould channel. In this way, it was found that it is possible to equilibrate the flow of molten material filling the mould in the upper part of the container structure.

In a particularly preferred embodiment of the present invention, the circular upper frame has a substantially L-shaped cross-section with a first circular portion disposed vertically to which the pillars are linked, said vertical portion being linked at its upper side to a second horizontal circular portion forming a peripheral edge, said first vertical portion having a height a and a thickness x, said second horizontal portion having a width b and a thickness y, and the ratio of thicknesses of the container top edge portions is such that x>y, and the ratio of the cross-sections of the container top edge portions is such that xa>yb.

The lower side of the container can have the shape of a cone, a disk, a truncated pyramid, a hemisphere, or any other similar shape. Preferably, the lower side of the container has the shape of a dome, whose convexity is turned outwardly. This shape is particularly advantageous to receive a specific dispensing structure as that described and claimed by the applicant in the European patents n° EP 1472156 B1, EP 1574452 B1 and in European patent applications n° EP 1604915 A1 and EP 1808382 A1.

Advantageously the in-mould label is of lower rigidity than the support structure and designed to liquid-tightly seal said structure, at least along the side walls of the container.

Furthermore, the support structure is preferably dimensioned and/or designed to be easily compacted by compressing, twisting or pinching said container.

In some instances, it can be beneficial for the support structure that it comprises predetermined weakened zones. This will allow a user to compress or scrap the container after usage, so that it can be more easily disposed of and recycled, in a more compact format. The weakened zone will facilitate the compression of the container after usage, in a predetermined manner.

Advantageously, the in-mould label can be made at least partially transparent or translucent, so as to allow a user to verify the contents. This can also be particularly beneficial during manufacturing, so as to allow a proper quality control of the manufactured container, for instance to check on line that the container is properly filled, with the correct ingredient, and with an appropriate quantity of the said ingredient.

In a preferred embodiment of the invention, a top membrane is sealed onto the circular upper frame, so as to close the upper side of said container. This sealing of a top membrane can be done typically after filling of the container with its destination contents. The sealing can be done with any appropriate method such as for instance heat sealing or ultrasonic sealing, gluing, or a combination thereof.

In one possible embodiment of the present invention, the container comprises at least one wall disposed across the container internal chamber, such that the internal volume of said container is divided into at least two distinct compartments.

In this case, said at least one wall is preferably disposed horizontally within the container chamber, such that the corresponding compartments are superimposed one onto the other.

In one additional possibility, the dividing wall is pierced with at least one but preferably a plurality of holes. Such a pierced dividing wall can be used for example to hold under pressure a mass of roast and ground powdered coffee in the lower compartment created inside the container chamber. Such a construction will allow preparing an espresso-like coffee beverage, as the pierced dividing wall will allow dividing the flow of fluid and improving the wetting of the coffee powder by said fluid, along with the principle described and claimed in the applicant's former European patent n° EP 1784344 B1.

The present invention is also directed to a method for manufacturing a container, preferably a capsule for use in a food preparation machine, as described above, the method comprising the steps of:

positioning an in-mould label into a mould,
  injecting a plastic material into the mould such that it forms a support structure having at least one hollow portion closed by the label.

Preferably, the in-mould label is connected to axial and/or transversal support pillars of the structure, thereby sealing the at least one hollow portion of the support structure. Also preferably, the in-mould label and the support structure are positioned relative to each other such that the in-mould label essentially forms at least a lateral side wall of the container.

Finally, the invention is directed to a system for the preparation of food products, particularly beverages, which comprises in combination:

(i) a capsule according to any of the claims 1 to 10 which encloses at least one ingredient to be dissolved and/or extracted by a fluid injected in said capsule, and
  (ii) a machine for the preparation of said food product, which is adapted to receive said capsule and inject a fluid under pressure inside said capsule, so as to prepare a food product, preferably a beverage, by extraction and/or dissolution of the ingredient contained in said capsule with said fluid.

BRIEF DESCRIPTION OF THE DRAWINGS

Additional features and advantages of the present invention are described in, and will be apparent from, the description of the presently preferred embodiments which are set out below with reference to the drawings in which:

FIG. 1 is a schematic partially cut perspective view of the structure of a capsule according to the invention;

FIG. 2 is a schematic top view similar to FIG. 1 without a top wall.

DETAILED DESCRIPTION OF THE INVENTION

The capsule according to the invention comprises a semi-rigid structure 1 that is injection moulded, as shown in FIG. 1 and FIG. 2.

Said capsule is meant for use in a food preparation machine, and comprises the rigid or semi-rigid structure 1 with a lower side 2, at least three substantially vertical pillars 3 extending from the lower side 2 and linked to a circular upper frame 4 which defines the surroundings of the container top side, the pillars 3 having cross-sections $S_1$, $S_2$ and $S_3$, the lower side 2 being a solid wall that comprises a through hole 5 as a dispensing opening for the container, that is centred across the vertical symmetry axis VSA of said container.

The capsule further comprises a label 6 attached to the outer surface of the lower side 2, and attached also to the outer surface of the pillars 3 and of the upper circular frame 4. The label 6 thus forms an envelope that defines capsule side walls.

The capsule is manufactured according to known in-mould labelling (IML) techniques, such that the label is attached to the structure within the mould, at the time the structure is injection-moulded.

As shown in FIGS. 1 and 2, the injection point IP of the capsule structure 1 is disposed in the vicinity of the dispensing opening 5, on the outer surface of the lower side 2.

As an essential feature of the invention, the injection point IP of the container is off-centered in the vicinity of the dispensing opening 5, opposed the pillar having a cross section $S_3$, relatively to the vertical symmetry axis of the container; furthermore, $S_1=S_2$ and $S_3>S_1$.

As illustrated in FIG. 1, the upper frame 4 has an L-shaped cross-section, with a first circular portion 7 disposed vertically to which a vertical pillar 3 of the structure 1 is linked.

Said vertical portion 7 is linked at its upper side to a second horizontal circular portion 8 forming a peripheral edge.

The first vertical portion 7 has a height "a" and a thickness "x", while the second horizontal portion 8 has a width "b" and a thickness "y".

According to a preferred characteristic of the invention, the ratio of thicknesses of the capsule top edge portions is such that $x>y$, and in the ratio of the cross-sections of the capsule top edge portions is such that $xa>yb$.

These ratios are particularly preferred for the invention as they condition the better flowability of the molten thermoplastic material into the injection mould during the in-mould labelling injection process, and avoid that molten material displaces the label 6 during the injection process, which would cause defects in the capsule structure and would lead to undesired wrinkles across the surface of the label.

More precisely, given the fact that the injection point IP is in the vicinity of the centre of the capsule's lower side 2, the flow of molten material within the injection mould is as follows. First, the cavity of the mould corresponding to the lower side 2 is filled with material, then the molten plastic continues to flow outwardly from the injection point IP, to build the pillars 3, and then the molten material flows through the cavity corresponding to the circular upper frame 4, to complete the structure of the capsule.

As it was found by the applicant, the molten material flows preferentially in the portions of the injection mould cavities which have the biggest cross section. In particular, when the said molten material flows into the upper circular frame 4 of the structure 1, the vertical portion 7 will be constituted first, and then the molten material will flow towards the rest of the cavity to build the horizontal portion 8 of the upper frame.

Due to this "step-by-step" filling process of the mould cavity in the region of the upper frame 4, the problem of molten plastic material flowing too rapidly in the horizontal region and disengagement of the label 6 from its initial position in the mould is solved, and as result, the problem of plastic material being positioned "behind" the label—that is to say material flowing across the outer surface of the label—is solved as well. As explained above, such a portion of plastic material being positioned behind the label is particularly undesirable as it causes wrinkles or creases in the surface of the label, and then, in the surface of the capsule's side walls, which leads to leakage or damage during the capsule usage.

As shown in FIG. 1, the upper side of the capsule structure can be closed by a top wall membrane 9, which is preferably heat sealed or ultrasonically sealed after the capsule has been filled with its contents. Preferably, top membrane 9 is a pierceable membrane that can be pierced by a needle of the beverage preparation machine. Such a needle—not represented in the drawing—pierces the capsule for injecting an extraction/dissolution fluid under pressure as previously described in the preamble of the present specification. Such machines and fluid injection process will not be described further as they are generally known.

The in-mould label is preferably made of plastic material such as polypropylene (PP) or a multilayer comprising at least one plastic layer such as PP and at least one barrier layer such as ethylvinylalcohol (EVOH), aluminium, aluminium oxide (AlOx), $SiO_2$, and polyamide. Furthermore, the label may also comprise resin layer(s) for decorative purpose such as on its outer surface. The in-mould label may be of multilayered design and thus comprise several layers of different plastic material arranged above each other. One of these layers can be gas barrier layer such as EVOH.

The thickness of the in-mould label is preferably between 20 and 200 µm, more preferably between 50 and 120 µm. Thereby, in the portions of the support structure which are covered by the in-mould label, said in-mould label preferably constitutes the only outer wall of the capsule.

For certain capsules, the in-mould label may comprise increased gas barrier properties compared to the support structure.

Hence, the gas barrier properties of the capsule can be particularly enhanced in strategic areas covered by the in-mould label. Accordingly, such a capsule is particularly useful in preventing transfer of gases such as water vapour, carbon dioxide, oxygen and nitrogen through at least the portions of the capsule which are covered by the in-mould label. Moreover, the weight of the capsule is minimized by at the same time maintaining the sealing functions thereof.

In a preferred embodiment, the support structure is designed to be easily compacted for instance by twisting or compressing the capsule in one or more privileged directions. The structure can thus be designed for providing a lesser resistance to compression in at least one privileged direction such as by providing an easy bendable or breakable structure, for example by specially oriented links and/or zones of reduced thickness and/or weakened areas. Accordingly, enhanced recycling properties of the capsule can be obtained. In a possible mode, the support structure may therefore comprise predetermined weakened zones such as e.g. grooves or recessions at which the links of the support structure are bent or broken when compressing, twisting or pinching the capsule by a dedicated device or a human operator for example.

Accordingly, the size of the capsule after usage thereof can be significantly reduced into a compressed format thereby enhancing the recycling properties thereof.

The in-mould label connected to the support structure may be at least partially transparent or translucent. Hence, the content of the capsule may be inspected from outside. Accordingly, a stable light-weight capsule made of plastic material can be provided which is at least partially transparent or translucent. Furthermore, the label may bear decorative or identification elements such as brands, logos, names, pictures, etc. In particular, at least the outer surface of the in-mould label can be printed. Thereby, several different printing processes, such as flexography, offset, screen and hot stamping may be applied.

The invention also proposes a method for manufacturing a capsule for food substance, the method comprising the steps of positioning an in-mould label into a mould, injecting of a plastic material into the mould such that it forms a support structure having at least one "window" portion closed by the label.

Accordingly, an in-mould label of a predefined shape suitable for forming at least a lateral and/or a transversal portion of the capsule to be manufactured is cut out from raw material and is placed into a mould having an inner surface corresponding to the outer surface of the plastic capsule. Then, the mould is closed and plastic material is injected into the mould to form the rigid support structure which preferably comprises a plurality of axial and/or transversal support pillars to which the in-mould label is sealed. Thereby the at least one window portion of the support structure, i.e. the portion of the structure which does not comprise any material, is covered and thus sealed by means of the in-mould label.

The in-mould label is preferably constructed of a material chosen amongst paper, film material plastic and combinations thereof, which is able to tolerate the heat from the molding process. Due to the in-mould labeling process, the need for assembling the label by a separate operation to the structure is eliminated. Accordingly, the production can be carried out in a minimal number of steps and with rationalized equipment and labor.

The label can be provided with a printing thereon. At least one of its layers is printed. Thereby, several different printing processes, such as flexography, offset, screen and hot stamping may be applied. The in-mould label is also preferably water, grease, weather, and scuff resistant.

After the label is bonded to the support structure, the in-mould label appears as an integral part of the capsule and thus, usually no steps, recesses or ridges are visible at the overlapping portions of the support structure and the in-mould label. Accordingly, the shelf appeal of the capsule is enhanced.

Preferably, the mould to be used is formed such that the support structure being formed by the injected plastic material is positioned relative to the in-mould label such that it abuts only on a portion of the in-mould label. More preferably, at least the lateral sides of the capsule are essentially formed by the in-mould label. Accordingly, a large portion of the lateral and/or bottom wall of the capsule is constituted by the in-mould label. Thereby, the rather flexible in-mould label is supported particularly by the pillars of the support structure.

During molding, the side portions respectively the circumferential edges of the pre-cut in-mould label are preferably arranged within the mould such that the circumferential edges or side portions are fully supported by the correspondingly arranged support pillars of the support structure. Hence, a bonded arrangement of the support structure and in-mould label is obtained.

The label may be heated before the injection molding operation. Heating of the label may compensate for the contraction of the plastic of the structure which may cause wrinkles on the label after cooling of the capsule. Heating of the label can be carried out in an oven or by contact in the injection mould.

A capsule manufactured by means of the method according to the present invention may be of any geometrical shape and design. The capsule may be in a shape of e.g. a receptacle for receiving liquid comestibles. Moreover, other shapes such as rectangular shaped storages boxes may be formed by the method according to the invention in order to provide a light-weight capsule with improved gas barrier properties.

It should be understood that various changes and modifications to the presently preferred embodiments described herein will be apparent to those skilled in the art. Such changes and modifications can be made without departing from the spirit and scope of the present invention and without diminishing its attendant advantages. It is therefore intended that such changes and modifications be covered by the appended claims.

The invention claimed is:

1. An injection-molded container, the container for use in a food preparation machine, comprising:
    a rigid or semi rigid structure with a lower side, at least three pillars extending from the lower side and linked to a circular upper frame which defines the surroundings of the container top side, the pillars having cross-sections $S_1$, $S_2$, and $S_3$, the lower side being a solid wall that comprises a through hole as a dispensing opening for the container, that is centered across the vertical symmetry axis of the container;
    a label attached to the outer surface of the lower side of the pillars and of the upper circular frame, thus forming an envelope that defines the container side walls; and
    an injection point of the container is off-centered in the vicinity of the dispensing opening, opposed the pillar having a cross-section $S_3$ relatively to the vertical symmetry axis of the container, and in that $S_1=S_2$ and $S_3>S_1$.

2. A container according to claim 1, wherein the circular upper frame has a substantially L-shaped cross-section with a first circular portion disposed vertically to which the pillars are linked, the vertical portion being linked at its upper side to a second horizontal circular portion forming a peripheral edge, the first vertical portion having a height a and a thickness x, the second horizontal portion having a width b and a thickness y, and the ratio of thicknesses of the container top edge portions is such that x >y, and the ratio of the cross-sections of the container top edge portions is such that xa >yb.

3. A container according to claim 1, wherein the lower side of the capsule has a shape selected from the group consisting of a cone, a disk, a truncated pyramid and a hemisphere.

4. A container according to claim 1, wherein the in-mold label is of a lower rigidity than the support structure and designed to liquid-tightly seal the structure, at least along the side walls of the capsule.

5. A container according to claim 1, wherein the support structure is dimensioned and/or designed to be easily compacted by compressing, twisting or pinching the capsule.

6. A container according to claim 1, wherein the support structure comprises predetermined weakened zones.

7. A container according to claim 1, wherein the in-mold label is at least partially transparent or translucent.

8. A container according to claim 1, wherein a top membrane is sealed onto the circular upper frame, so as to close the upper side of the capsule.

9. A container according to claim 1, which comprises at least one wall disposed across the capsule internal chamber, such that the internal volume of the capsule is divided into at least two distinct compartments.

10. A container according to claim 9, wherein the at least one wall is disposed horizontally within the capsule chamber, such that the corresponding compartments are superimposed one onto the other.

11. A method for manufacturing a container, the method comprising the steps of:
    positioning an in mold label into a mold;
    injecting a plastic material into the mold such that is forms a support structure having at least one hollow portion closed by the label and creates a structure comprising an injection-molded container, the container for use in a food preparation machine comprising a structure with a lower side, at least three pillars extending from the lower side and linked to a circular upper frame, the pillars having cross sections $S_1$, $S_2$, and $S_3$, the lower side being a solid wall that comprises a through hole as a dispensing opening for the container, that is centered across the vertical symmetry axis of the container, and an injection point of the container is off-centered in the vicinity of the dispensing opening, opposed the pillar having a cross-section $S_3$ relatively to the vertical symmetry axis of the container, and in that $S_1=S_2$ and $S_3>S_1$.

12. A method according to claim 11, wherein the in-mold label is connected to axial and/or transversal support pillars of the structure, thereby sealing the at least one hollow portion of the support structure.

13. A method according to claim 11, wherein the in-mold label and the support structure are positioned relative to each other such that the in-mold label essentially forms at least a lateral side wall of the capsule.

14. A system for the preparation of food products which comprises in combination:
    a capsule for use in a food preparation machine comprising a rigid or semi-rigid structure with a lower side, at least three pillars extending from the lower side and linked to a circular upper frame which defines the surroundings of the container top side, the pillars having cross-sections $S_1$, $S_2$ and $S_3$, the lower side being a solid wall that comprises a through hole as a dispensing opening for the container, that is centered across the vertical symmetry axis of the container, a label attached to the outer surface of the lower side of the pillars and of the upper circular frame, thus forming an envelope that defines container side walls, and an injection point of the container is off-centered in the vicinity of the dispensing opening, opposed the pillar having a cross section $S_3$ relatively to the vertical symmetry axis of the container, and in that $S_1=S_2$ and $S_3>S_1$ encloses at least one ingredient to be dissolved and/or extracted by a fluid injected in said capsule; and
    a machine for the preparation of the food product, which is adapted to receive the capsule and inject a fluid under pressure inside the capsule, so as to prepare a food product by extraction and/or dissolution of the ingredient contained in the capsule with the fluid.

* * * * *